(12) United States Patent
Valet et al.

(10) Patent No.: US 8,833,482 B2
(45) Date of Patent: Sep. 16, 2014

(54) TRACTOR IMPLEMENT SUPPORT LINKAGE

(75) Inventors: Nicolas Valet, Luzy (FR); Sebastien Gauthier, Beauvais (FR)

(73) Assignee: AGCo Corporation, Duluth, GA (US)

( * ) Notice: Subject to any disclaimer, the term of this patent is extended or adjusted under 35 U.S.C. 154(b) by 122 days.

(21) Appl. No.: 13/522,144

(22) PCT Filed: Jan. 6, 2011

(86) PCT No.: PCT/IB2011/000013
§ 371 (c)(1),
(2), (4) Date: Feb. 13, 2013

(87) PCT Pub. No.: WO2011/086444
PCT Pub. Date: Jul. 21, 2011

(65) Prior Publication Data
US 2013/0133905 A1    May 30, 2013

(30) Foreign Application Priority Data

Jan. 14, 2010    (GB) .................................. 1000537.9

(51) Int. Cl.
*A01B 59/04*    (2006.01)
*A01B 59/00*    (2006.01)
*A01B 59/06*    (2006.01)

(52) U.S. Cl.
CPC ............. *A01B 59/002* (2013.01); *A01B 59/068* (2013.01)
USPC .......................................... 172/448; 172/439

(58) Field of Classification Search
USPC .................. 172/307, 439, 444, 448
See application file for complete search history.

(56) References Cited

U.S. PATENT DOCUMENTS 2,822,738 A * 2/1958 Smith ............................ 172/239
4,659,102 A * 4/1987 Stuhrmann et al. ........... 280/481
4,715,770 A * 12/1987 Kryscyk ......................... 414/680

(Continued)

FOREIGN PATENT DOCUMENTS

EP            1842412 A1    10/2007
WO    WO-2007/149878 A2    12/2007

OTHER PUBLICATIONS

International Search Report for International Application No. PCT/IB2011/000013 Dated Jun. 20, 2011.

(Continued)

*Primary Examiner* — Matthew D Troutman

(57) ABSTRACT

A tractor implement support linkage has a pair of implement attachment links (11), each link being provided at its outer end with an implement attachment means (12) and being pivoted (13) at its inner end on a first arm (14). The first arm is pivoted (15) at its inner end on a support frame (16), the outer end (14*a*) of each first arm being moveable by a lift means (18) for raising and lowering the first arm about its inner pivot (15) on the support frame (16). Each link (11) is also connected (20) with a second arm (21) which is pivoted at its inner end (22) on the support frame (16) and is pivotally connected at its outer end (20) with the link (11). The second arm (21) rotates the link (11) about its connection (13) with the first arm (14) as the first arm is rotated about its pivot (15) on the support frame (16) by the lift means (18) thus increasing the pivotal movement of the implement attachment means (12) relative to the support frame (16) for a given movement of the lift means (18).

12 Claims, 5 Drawing Sheets

(56) References Cited

U.S. PATENT DOCUMENTS 6,062,321 A     5/2000   Defrancq
6,422,322 B1 *   7/2002   Hoffart ........................ 172/439
6,431,288 B1     8/2002   Hoffart
7,828,071 B2 *   11/2010   Breneur et al. ............... 172/439

OTHER PUBLICATIONS

UK Search Report for UK Application No. GB1000537.9 Dated May 13, 2010.

* cited by examiner

TRACTOR IMPLEMENT SUPPORT LINKAGE

This invention relates to tractor implement support linkages in which pivoting implement attachment links mount an implement on a tractor chassis with the links being pivoted relative to the chassis by a lift means, such as hydraulic cylinders, during use of the implement and transport of the implement to and from its working location.

There is also a requirement that, when the linkage is not in sue, it can be raised to a stowed position which is considerable higher than when the linkage is in use in order to reduce the projection of the linkage from the tractor. This requirement to raise the linkage to a higher stowed position can be difficult to realise without using a lifting means which has a long stroke and is therefore both expensive and bulky. Whilst this requirement is particularly beneficial for implement support linkages mounted on the front of a tractor, it is also applicable to rear mounted linkages.

It is an object of the present invention to provide a tractor implement support linkage which addresses the above stowage issue.

Thus according to the present invention there is provided a tractor implement support linkage having a pair of implement attachment links, each link being provided at its outer end with an implement attachment means and being pivoted at its inner end on a first arm, the first arm being pivoted at its inner end on a support frame, the outer end of each first arm being moveable by a lift means for raising and lowering the first arm about its inner pivot on the support frame, each link also being connected with a second arm which is pivoted at its inner end on the support frame and is pivotally connected at its outer end with the link, the second arm rotating the link about its connection with the first arm as the first arm is rotated about its pivot on the support frame by the lift means thus increasing the pivotal movement of the implement attachment means relative to the support frame for a given movement of the lift means.

Each link may be pivoted at its inner end on an intermediate portion of the first arm and the outer end of the first arm may be directly connected with the lift means.

Alternatively each link may be pivoted at its inner end on the outer end of the first arm and the lift means may be directly connected to the link.

The lift means may comprise one or more hydraulic cylinders which act between the first arms and the support frame.

Preferably the outer end of the second link is connected with the associated link via a lever arm which amplifies the pivoting of the link about its mounting on the first arm as the first arm is rotated.

The first and second arms may conveniently cross-over each other with the first arm mounted at a higher point on the support frame than the second arm.

The present invention will now be described, by way of example only, with reference to the accompanying drawings in which.

Figure 1:
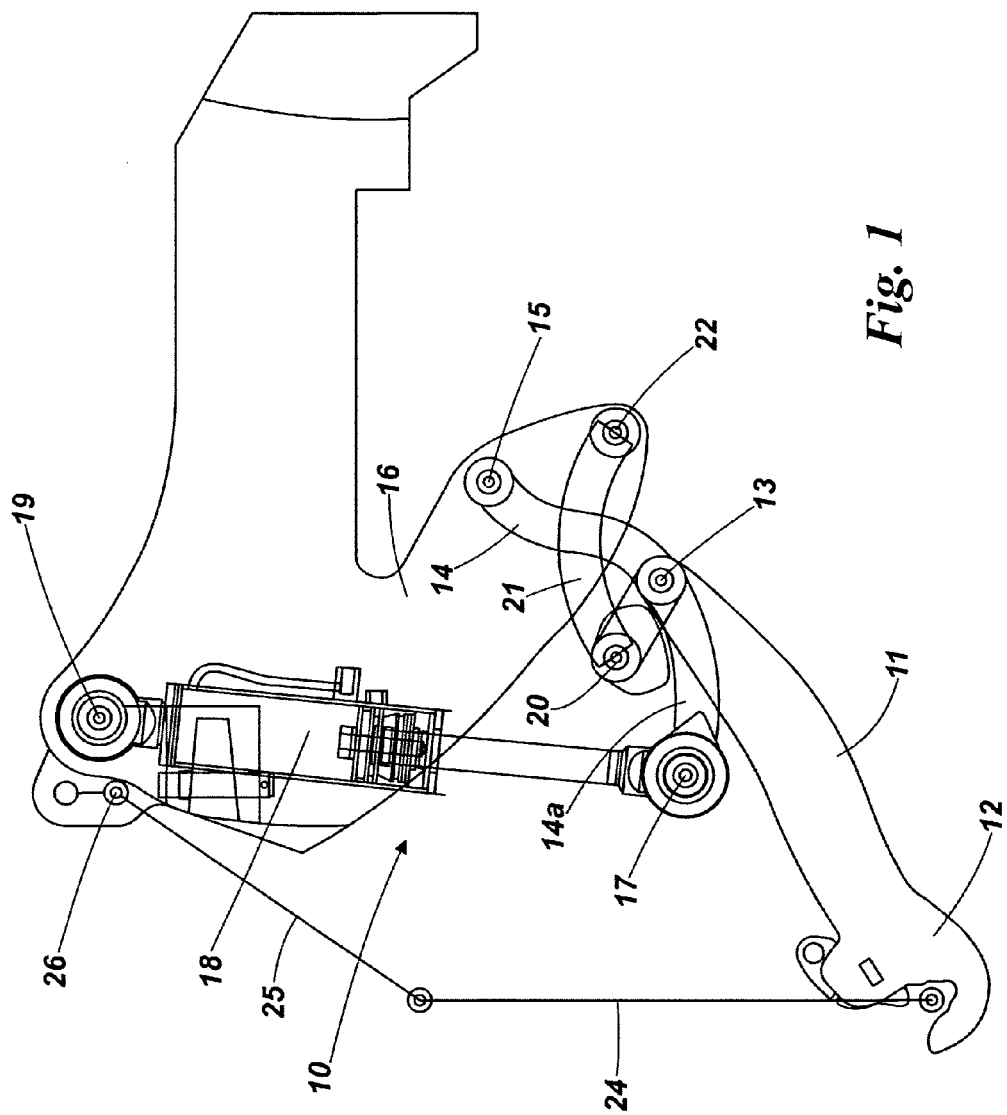
FIG. 1 shows a tractor front implement support linkage in accordance with the present invention in its fully lowered position.

Referring to the drawings, the tractor front support linkage 10 has a pair of laterally spaced implement attachment links 11 provide with implement attachment hooks 12 at their outer ends. The other end of each link 11 is pivotally mounted at 13 on a first respective arm 14 which is also pivotally mounted at 15 on a frame 16 which forms part of the front section of the tractor chassis. The other end 14*a* of each first arm 14 is pivotally connected at 17 to an implement lift means in the form of a hydraulic cylinder 18 which is attached at 19 to the frame 16.

Each implement attachment link 11 is also pivotally connected at 20 with a respective second arm 21 which is itself pivotally connected at 22 to the frame 16. As can be seen, the spacing of the pivotal connections 13 and 20 on the attachment links 11 provides a lever arm L (see FIGS. 3 &4) which improves the efficiency of the linkage.

Figure 3:
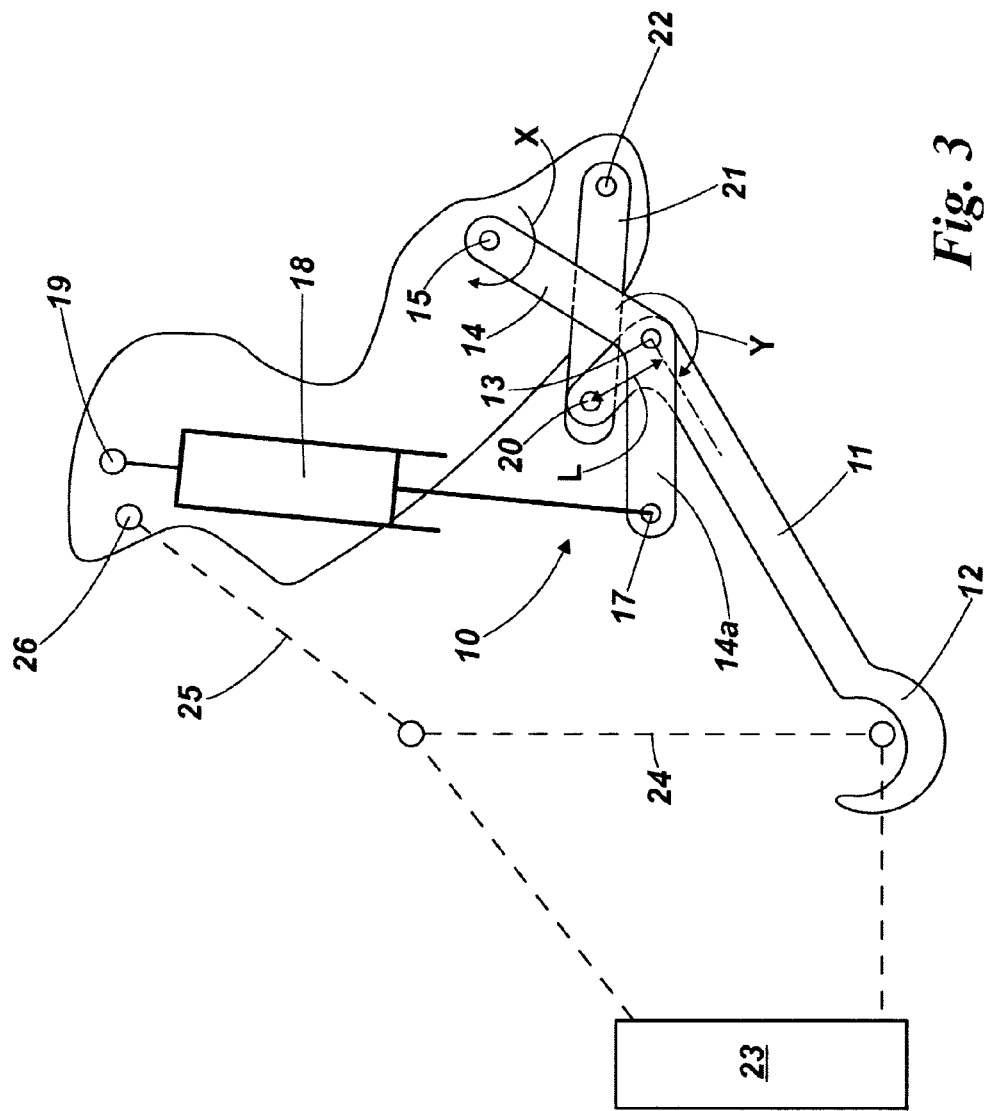
FIGS. 3 and 4 shows simplified diagrammatic views of FIGS. 1 and 2 respectively to more clearly show the basic linkage construction.

FIGS. 1 and 3 shows the support linkage in its fully lowered position when each of the hydraulic cylinders 18 is fully extended. During use of the support linkage an implement shown diagrammatically at 23 in FIGS. 3 and 4 has its support frame 24 gripped in jaws 12 and is connected by the customary top link 25 to the frame 16 via the pivotal connection 26.

Thus during use of the implement the attachment links 11 are raised and lowered by the cylinders 18 so that the attachment links occupy positions in which they are generally horizontal.

Figure 2:
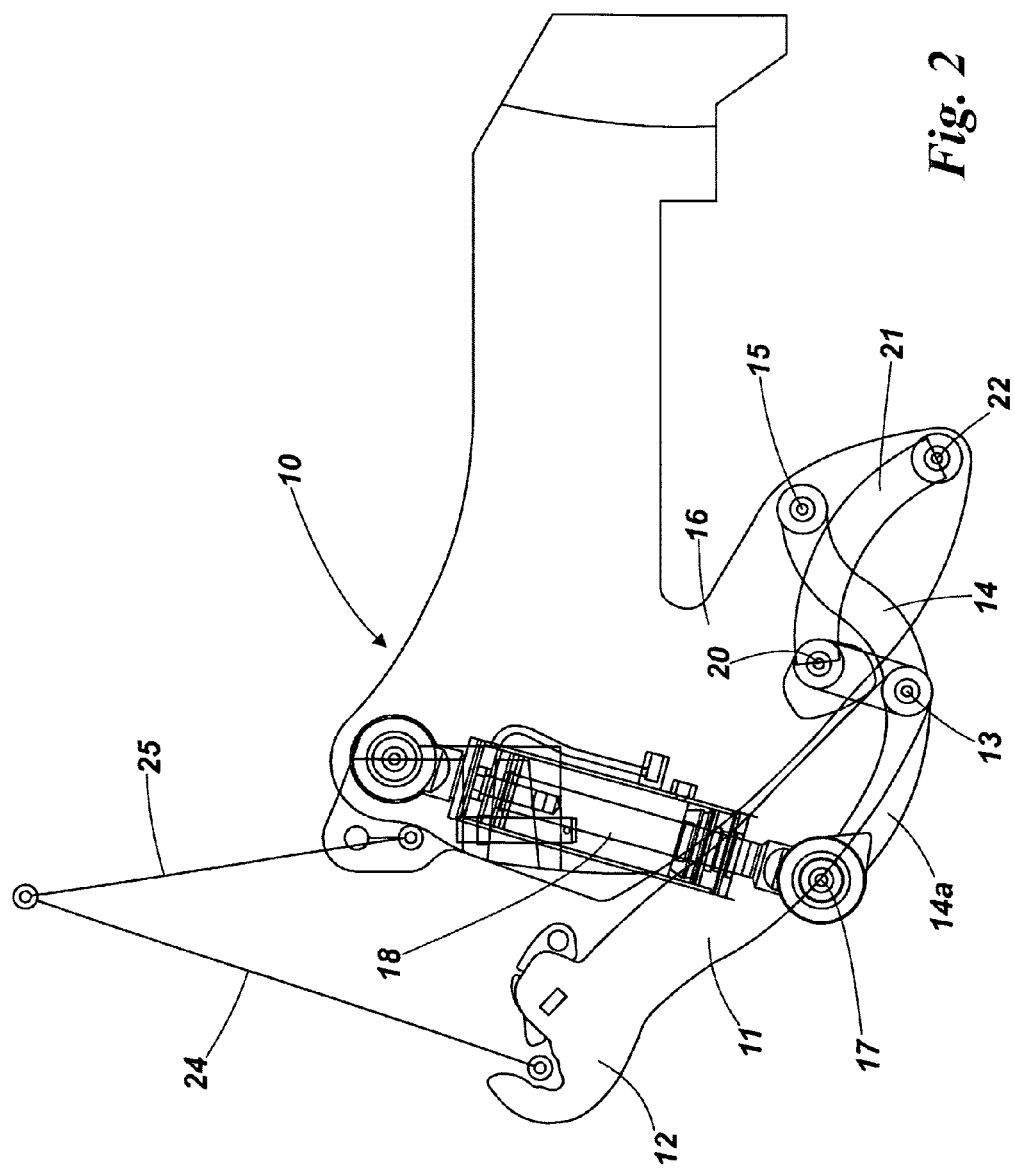
FIG. 2 shows the linkage of FIG. 1 in its fully raised stowed position.
Figure 4:
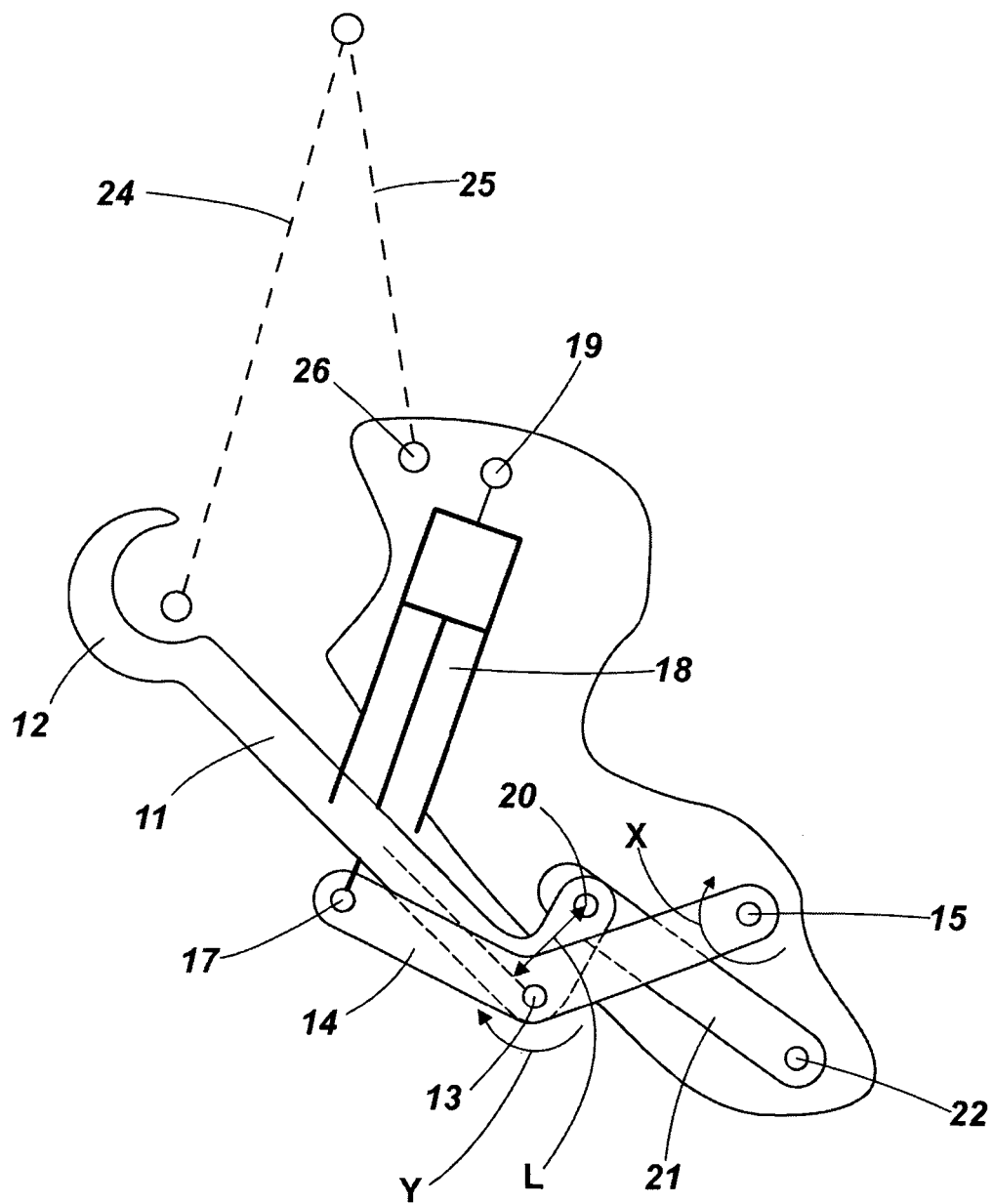

If the implement 23 has been detached and the support linkage is not in use, and it is desired to raise the linkage to the fully stowed position, the hydraulic cylinders 18 are retracted to their fully retracted position shown in FIGS. 2 and 4 which causes the linkage to rotate as follows. As the cylinders 18 are shortened the first arms 14 are pivoted about their connections 15 on the frame 16 (as indicated by arrow X) thus causing the pivot points 14 of the attachment links to be raised relative to the frame 16. Due to the provision of the second links 21, as both the first links 14 are raised the second links 21 cause the attachment links 11 to rotate relative to the first links 14 (as indicated by arrow Y), this rotating effect being amplified by the lever arm L previously referred to.

As will be appreciated, it is therefore possible to achieve a large amount of rotation of the attachment links 11 relative to the frame 16 without requiring the cylinders 18 to be excessively long.

Figure 5:
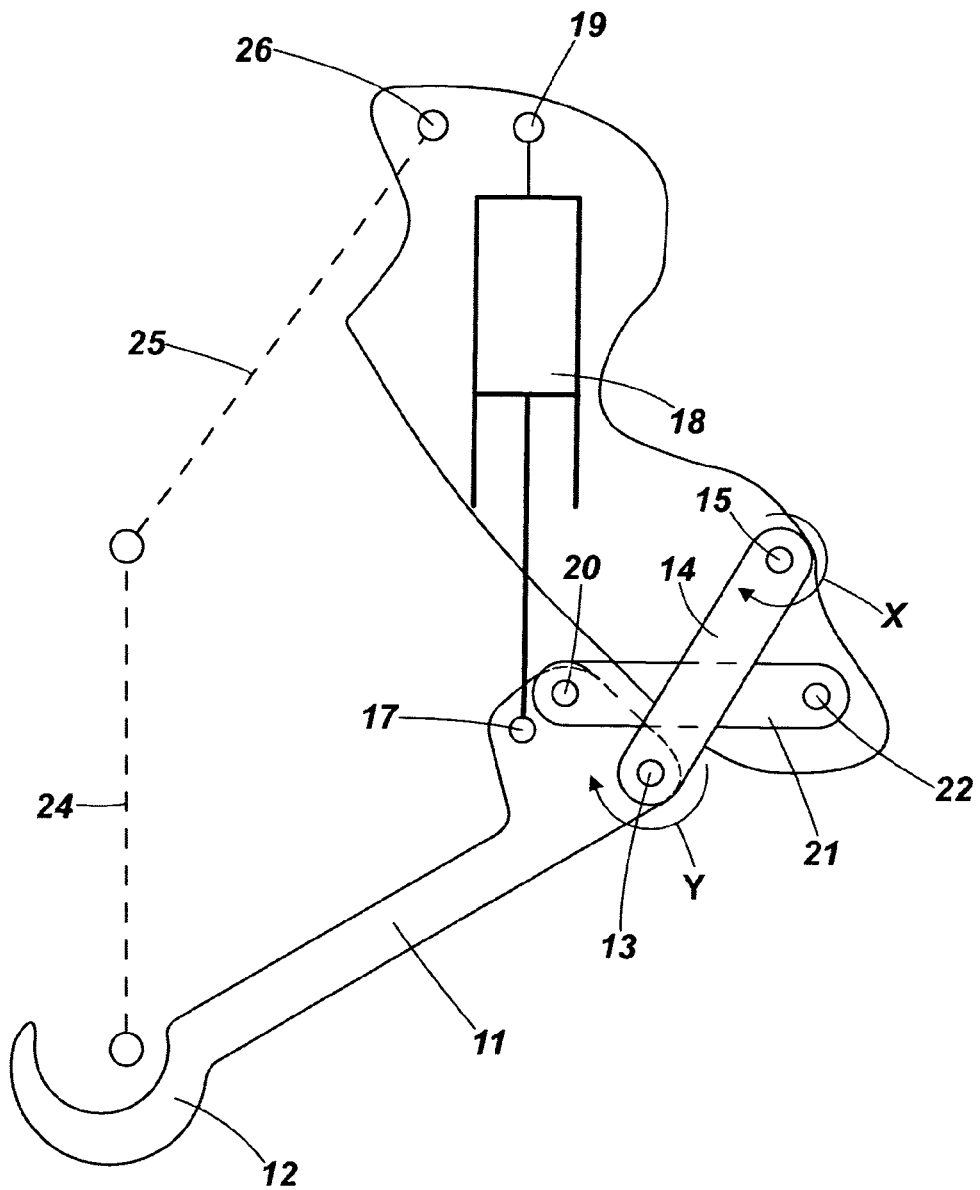
FIG. 5 shows in diagrammatic an alternative form of linkage in accordance with the present invention.

FIG. 5 shows an alternative form of linkage in accordance with the present invention in which the cylinder 18 is not connected directly with the first arm 14 but is connected directly at 17 with the link 11. This alternative form of linkage functions in a similar manner to that shown in FIGS. 1 to 4 since, as cylinder 18 is shortened, arm 14 rotates in the direction of arrow X and arm 21 causes link 11 to rotate about pivot 13 in the direction of arrow Y.

As will be appreciated, although the invention has been described above in relation to a front mounted implement support linkage it is also applicable to conventional rear mounted draft links.

The invention claimed is:

1. A tractor implement support linkage having a pair of implement attachment links, each link being provided at its outer end with an implement attachment means and being pivoted at its inner end on an intermediate portion of a first arm, the first arm being pivoted at its inner end on a support frame, the outer end of each first arm being connected with a lift means for raising and lowering the first arm about its inner pivot on the support frame, each link also being connected with a second arm which is pivoted at its inner end on the support frame and is pivotally connected at its outer end on the link, the second arm rotating the link about its connection with the first arm as the first arm is rotated about its pivot on the support frame by the lift means thus increasing the pivotal movement of the implement attachment means relative to the support frame for a given movement of the lift means.

2. The linkage according to claim 1 in which the outer end of the first arm is directly connected with the lift means.

3. The linkage according to claim 1 in which the lift means comprises one or more hydraulic cylinders which act between the first arms and the support frame.

4. The linkage according to claim 1 in which the outer end of the second link is connected with the associated link via a lever arm which amplifies the pivoting of the link about its mounting on the first arm as the first arm is rotated.

5. The linkage according to claim 1 in which the first and second arms cross-over each other with the first arm mounted at a higher point on the support frame than the second arm.

6. The linkage according to claim 2 in which the lift means comprises one or more hydraulic cylinders which act between the first arms and the support frame.

7. The linkage according to claim 2 in which the outer end of the second link is connected with the associated link via a lever arm which amplifies the pivoting of the link about its mounting on the first arm as the first arm is rotated.

8. The linkage according to claim 3 in which the outer end of the second link is connected with the associated link via a lever arm which amplifies the pivoting of the link about its mounting on the first arm as the first arm is rotated.

9. The linkage according to claim 2 in which the first and second arms cross-over each other with the first arm mounted at a higher point on the support frame than the second arm.

10. The linkage according to claim 3 in which the first and second arms cross-over each other with the first arm mounted at a higher point on the support frame than the second arm.

11. The linkage according to claim 4 in which the first and second arms cross-over each other with the first arm mounted at a higher point on the support frame than the second arm.

12. A tractor implement support linkage having a pair of implement attachment links, each link being provided at its outer end with an implement attachment means and being pivoted at its inner end on the outer end of a first arm, the first arm being pivoted at its inner end on a support frame, the link being connected with a lift means for raising and lowering the link about its inner pivot on the support frame, each link also being connected with a second arm which is pivoted at its inner end on the support frame and is pivotally connected at its outer end on the link, the second arm rotating the link about its connection with the first arm as the first arm is rotated about its pivot on the support frame by the lift means thus increasing the pivotal movement of the implement attachment means relative to the support frame for a given movement of the lift means.

\* \* \* \* \*